United States Patent Office 3,557,048
Patented Jan. 19, 1971

3,557,048
ORGANIC DISPERSIONS OF COLORED CROSS-LINKABLE COPOLYMERS AND THEIR PRODUCTION
Hans Wilhelm, Ludwigshafen (Rhine), Klaus Gulbins, Limburgerhof Pfalz, and Heinrich Hartmann and Guenter Lange, Ludwigshafen (Rhine), Germany, assignors to Badische Anilin- & Soda-Fabrik Aktiengesellschaft, Ludwigshafen (Rhine), Germany
No Drawing. Filed Nov. 20, 1967, Ser. No. 684,510
Claims priority, application Germany, Nov. 26, 1966, 1,595,364
Int. Cl. C08f 45/14, 45/28, 45/22
U.S. Cl. 260—41          9 Claims

ABSTRACT OF THE DISCLOSURE

Organic dispersions of colored crosslinkable copolymers obtained by free-radical copolymerization of
(a) a dye which contains a polymerizable olefinically unsaturated group in the molecule with
(b) a comonomer containing in the molecule at least one N-methylol or N-alkoxymethyl group and
(c) a preponderant amount of a colorless comonomer which does not contain any groups capable of undergoing condensation, in
(d) an organic liquid in which the copolymer formed is not soluble, in the presence of
(e) a copolymer which is soluble in the organic liquid (d) and has been prepared from comonomers from groups (b) and (c).

---

The present invention relates to new organic dispersions of colored crosslinkable copolymers and their production.

Aqueous dispersions of colored crosslinkable copolymers of dyes containing in the molecule a polymerizable olefinically unsaturated group and of comonomers having condensable groups with or without other uncolored comonomers which do not contain any condensable groups are generally known. These dispersions are used for many purposes in the surface finishing of materials of all types, for example for paints or textile finishes. In the case of hydrophobic materials however they often cannot be used satisfactorily because the water-repellent forces interfere with adhesion. Moreover aqueous dispersions have only limited suitability for treating materials which are sensitive to water, for example for painting metal parts which readily corrode.

Dispersions having an organic liquid phase, such as are known for some colorless polymers, would certainly obviate the said disadvantages of aqueous dispersions but the production of organic dispersions offers technical difficulties. The comonomers commonly used are soluble in organic liquids. So at first are the polymers, and they are only later precipitated to form agglomerates of undesirably large particle size, as is known from precipitation polymerization. Precipitation polymers are however not easily redispersible to form stable dispersions and moreover such secondary dispersions, owing to the size of their particles, do not have the desirable properties of most primary dispersions; thus for example the particles are often no longer flowable as required for satisfactory and rapid film formation. The formation of large particles and consequently their precipitation may be prevented by the use of dispersing agents, but relatively large amounts of these dispersing agents are required which, because they remain in the polymer, seriously lessen the resistance to solvents of coatings prepared with the dispersions. Overcoming the disadvantages referred to is naturally more difficult the larger the number of types of comonomer participating in the formation of the copolymers.

THE INVENTION

We have now found organic dispersions of colored crosslinkable copolymers that have excellent properties and are highly versatile. These dispersions are obtained by conventional free radical copolymerization of:
(a) a dye containing in the molecule a polymerizable olefinically unsaturated group with
(b) a comonomer containing in the molecule at least one N-methylol or N-alkoxymethyl group, and
(c) a predominant amount of a colorless comonomer not containing any condensable groups, in
(d) an organic liquid in which the copolymer formed is not soluble, and in the presence of
(e) a copolymer which is soluble in the solvent (d) and which has been prepared from comonomers from groups (b) and (c).

The comonomers (a) include all dyes satisfying the definition, i.e. dyes of a great variety of classes. Among the numerous known compounds of this type, azo dyes, anthraquinone dyes and azo metal complex dyes are preferred which bear an acryloyloxy group or an acryloylamino group as the polymerizable group.

The general constitution of the azo dyes preferably used is defined by the formula: A—N=N—B in which A denotes a phenyl or naphthyl radical and B denotes a conventional radical accessible to a coupling reaction. These groups A and B may bear as substituents a great variety of auxochromic groups such as fluorine atoms, chlorine atoms, bromine atoms, hydroxyl groups, alkyl groups, alkoxy groups, carbalkoxy groups, cyano groups, nitro groups, carbamoyl groups, amino groups, monoalkylamino groups, dialkylamino groups, sulfonyl groups, sulfamoyl groups and sulfonamido groups. The polymerizable groups may be attached direct to the radicals A and B or to the auxochromic groups, as for example in the case of β-acryloyloxymethylamino or N-acryloylpiperazinyl groups. The same is true of azo metal complex dyes in which the groups A and B have to bear complex-forming substituents in ortho-position to the azo group. Mainly pure or mixed 1:1 complexes and 1:2 complexes with chromium, cobalt, copper, nickel and iron as the central atom are suitable.

The same considerations apply to anthraquinone dyes:

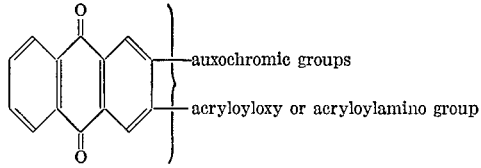

The dyes having the following formulae serve as representatives of many other compounds of similar constitution as examples of suitable colored comonomers:

(1) 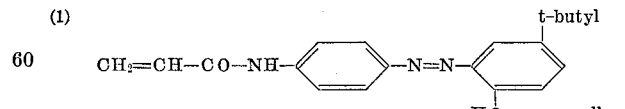

(2) 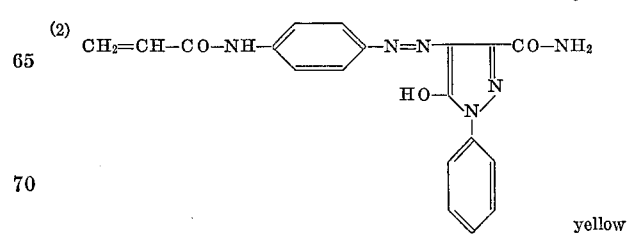

(3) 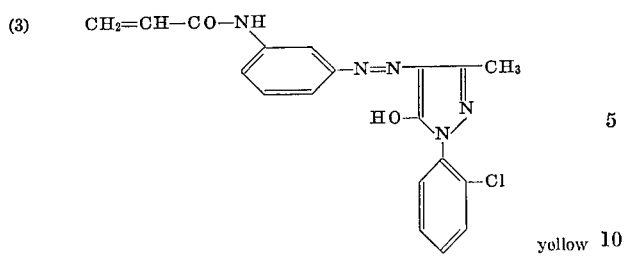
yellow (4) 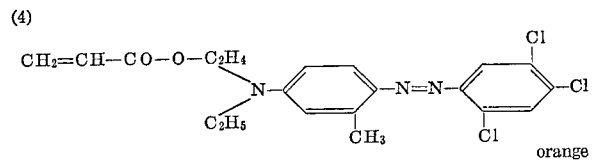
orange (5) 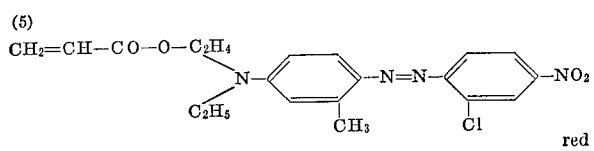
red (6) 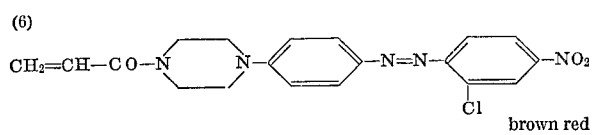
brown red (7) 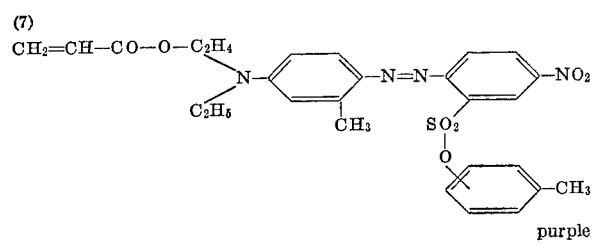
purple (8) 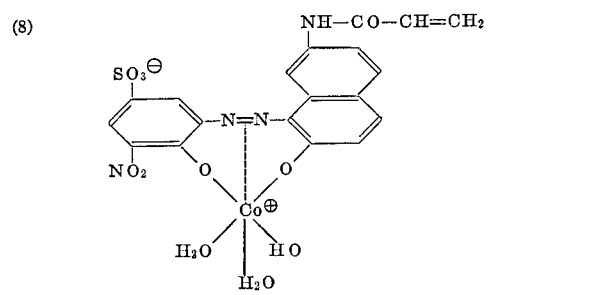

(9) 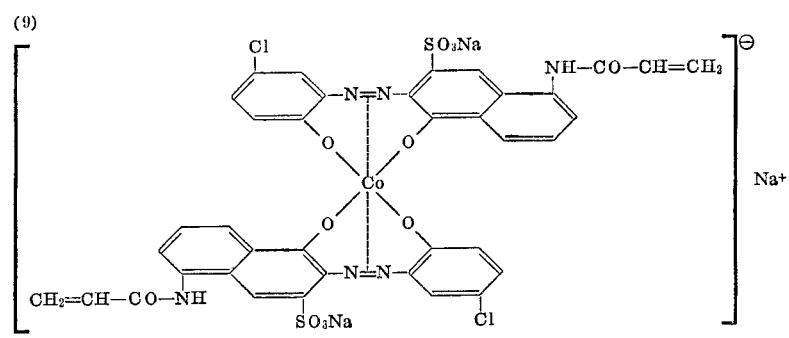

(10) 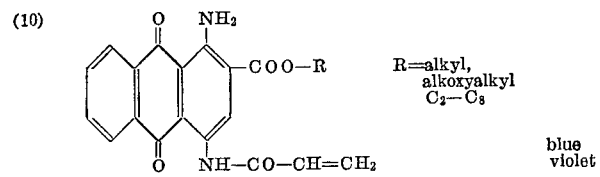
blue violet

Among the comonomers (b) as defined, the N-methylolamides and N-alkoxymethylamides of acrylic acid and methacrylic acid are preferred. Corresponding derivatives of crotonic acid, α-chloroacrylic acid, itaconic acid, maleic acid and N-acryloylurea are also suitable. The alkyl groups in the alkoxymethylamide derivatives preferably contain one to four carbon atoms.

The comonomers (c) are particularly the compounds conventionally used in the synthesis of polymeric paints and finishing agents, such as butadiene, styrene, vinyl chloride, vinylidene chloride, alkyl esters of acrylic acid, methacrylic acid and maleic acid having one to twelve carbon atoms in the alkyl radical, vinyl esters of alkylcarboxylic acids having two to twenty-four carbon atoms in the alkyl radical, acrylonitrile, methacrylonitrile and N-vinylpyrrolidone. For chemical modification of the copolymers (the methods for which are generally known), for example for imparting thereto an anionic, cationic or hydrophilic character, up to about 30% by weight of ionic or potentially ionic comonomers (c'), as for example acrylic acid, methacrylic acid, maleic acid, maleic anhydride, acrylamide, methacrylamide, N-vinylimidazole and N-vinylimidazolium methyl sulfate may be used (with reference to the amount of (c)).

The organic liquid (d) should be such that the copolymers formed are not soluble therein or at least only soluble therein to such an extent that the liquid phase of the dispersion is not appreciably more viscous than the pure liquid, because otherwise the advantages of the dispersions are lost. Small soluble fractions, for example up to about 10% of the total amount of polymer, are not as a rule detrimental. Whether or not an organic liquid is suitable as regards the condition of insolubility or sparing solubility of the copolymer may be ascertained without difficulty by preliminary experiment. As a rule it is true that sparing solubility of the copolymers in organic liquids can be caused by ionic comonomers, for example those of group (c'), or by strongly polar comonomers, such as acrylonitrile or methacrylonitrile; furthermore sparing solubility may be effected for example by N-methylol compounds from group (b), whereas the alkyl ethers of these N-methylol compounds (also belonging to group (b)) make the polymer organophilic and possibly soluble.

Thus there is a wide choice between aliphatic hydrocarbons, such as octane and ligroin, cycloaliphatic hydrocarbons, such as cyclohexane and perhydronaphthalene, aromatic hydrocarbons, such as benzene, toluene, the xylenes and terpenes, $C_1$ to $C_8$ alkanols, and aliphatic ketones, ethers and esters having up to about twelve carbon atoms. Chlorinated hydrocarbons, such as ethylene chloride, cyclic ethers, such as tetrahydrofuran and dioxane and acetonitrile are also suitable. Which of these liquids is preferred therefore depends on the particular application, e.g. the volatility and flashpoint required.

The virtually free choice of organic liquid is attributable to a considerable extent to the use of copolymer (e) in the production of the dispersion. The comonomers (b) are characteristic components of these copolymers; the other comonomers may be the compounds specified under (c). The solubility of copolymer (e) can be modified by varying the type and amount of comonomers (b) and (c).

The following approximate values (given in each case in percent by weight) apply for the relative amounts of all the components, although the values are not critical:

comonomer (a): 1 to 20%, preferably 3 to 15%;
comonomer (b): 2 to 30%, preferably 5 to 15%;
comonomer (c): 50 to 97%, preferably 70 to 92%;
(in each case with reference to the total amount of the comonomers (a), (b) and (c);
comonomer (b) in (e): 2 to 30%, preferably 5 to 15%, with reference to the amount of (e).

The amount of (e) may be from 5 to 100%, preferably from 10 to 50% of the amount of the copolymer of (a), (b) and (c). The mixture of the copolymer of (a), (b) and (c) and the copolymer (e) together should preferably have a solids content in the finished dispersion of 15 to 80%, particularly 40 to 60%, with reference to the total amount of dispersion.

There are preferably used therefore from 70 to 300% by weight (with reference to comonomers (a), (b) and (c)) of organic liquid (d). In special cases however the amount of (d) may be decreased to 30% by weight or increased to 1000% by weight, with reference to comonomers (a), (b) and (c).

It is also possible to start from mixtures of different comonomers (a) and/or (b) and/or (c). This is also true of copolymer (e) and particularly of organic liquid (d) whose solubility properties may thus be modified at will.

The copolymerization is carried out by a conventional method, for example by placing the bulk of the liquid (d) with the copolymer (e) dissolved therein in a container and allowing the mixture of comonomers (a), (b) and (c) to flow in at 40° to 120° C. at the rate at which the copolymerization proceeds.

Substances producing free radicals, such as benzoyl peroxide, cumene peroxide, lauroyl peroxide, perbenzoic acid, ammonium persulfate or azodiisobutyronitrile may be used as polymerization initiators in amounts of 0.01 to 5% with reference to the total amount of the comonomers (a), (b) and (c).

Copolymer (e) is soluble in the solvent; it has a dispersing effect on the copolymer formed in accordance with this invention. The addition of other dispersing agents is therefore not necessary and this constitutes a considerable advantage of the invention.

The finished dispersions are in general compatible with assistants and additives of all types, for example with leveling agents, anti-corrosives, matting agents, crosslinking catalysts and pigments. Solid additives usually require the use of a dispersing agent.

The dispersions are outstandingly suitable for resin finishing of textiles, leather and paper, as paints for wood, metal, glass, ceramics and concrete and as binders, for example for the production of bonded nonwovens and laminated plastics.

After the copolymers according to the invention have been applied to the substrates, they either crosslink autogenously by way of the methylol or methylol ether groups therein or this process is accelerated in conventional manner by heating and/or by means of an acid catalyst, such as ammonium nitrate or ammonium thiocyanate or for example boron trifluoride etherate. During the crosslinking, the copolymer (e), which previously acted as a dispersing agent, is incorporated into the macromolecular network of the colored copolymer with the result that the property of (e) as a dispersing agent is lost. This has a very advantageous effect on the durability of the coatings, which are extremely resistant to the action of solvents of all types.

The invention is illustrated by the following example.

EXAMPLE

A mixture of:
300 parts of gasoline (boiling range 80° to 140° C.);
150 parts of a 65% solution of a copolymer of
  20% of styrene,
  72% of 2-ethylhexyl acrylate,
  3% of N-vinylimidazole and
  5% of N-butoxymethylmethacrylamide
  in a mixture of xylene and ethyl acetate (ratio by weight: 5:2); and
40 parts of azodiisobutyronitrile
  is placed in a container. Then while stirring and under an atmosphere of nitrogen at 75° to 80° C.,
200 parts of ethyl acrylate
  is added followed, after polymerization has commenced, by a mixture of:
50 parts of the colored monomer 10 specified above (where R is β-propoxyethyl);
50 parts of N-butoxymethyl methacrylamide;
700 parts of ethyl acrylate and
1200 parts of gasoline (boiling range 80° to 140° C.).

The polymerization is over after about three hours.

In nine other analogous mixtures the dye 10 used as colored monomer is replaced by the dyes 1 to 9.

All the dispersions thus obtained have excellent properties and are miscible with each other in all proportions by virtue of their having the same liquid phase.

Coatings on iron cured at 140° C. with 1% of boron trifluoride etherate proved to be practically completely resistant to water and organic solvents even upon prolonged action.

We claim:
1. An organic dispersion having a solids content of from 15 to 80% by weight, with reference to the dispersion, of a colored crosslinkable copolymer which has been obtained by free-radical copolymerization of:
  (a) 1 to 20% by weight of a dye containing a polymerizable olefinically unsaturated group in the molecule, with
  (b) 2 to 30% by weight of a comonomer having a polymerizable olefinically unsaturated group and containing at least one N-methylol group or N-alkoxymethyl group in the molecule, and
  (c) 50 to 97% by weight of a colorless comonomer having a polymerizable olefinically unsaturated group free from an N-methylol group or an N-alkoxymethyl group; the percentages being with reference to the amount of the comonomers (a), (b) and (c);
  in an organic solution of
    (e) 5 to 100% by weight, with reference to the copolymer from (a), (b) and (c), of a copolymer of from 2 to 30% by weight of comonomer (b) and of from 98 to 70% by weight, with reference to the copolymer (e), of comonomer (c) in
  (d) an organic liquid, wherein the copolymer formed from (a), (b) and (c) is insoluble.

2. An organic dispersion as claimed in claim 1 which contains as the colored comonomer (a): an azo metal complex dye or an anthraquinone dye which contains an acryloyloxy group or an acryloylamino group as a polymerizable group.

3. An organic dispersion as claimed in claim 1 which contains as the comonomer (b) an N-methylolamide or N-alkoxymethylamide of acrylic acid or methacrylic acid in which the alkyl group in the N-alkoxymethylamide compound contains from one to four carbon atoms.

4. An organic dispersion as claimed in claim 2 having the following relative proportions of the comonomers:
comonomer (a): 3 to 15% by weight;
comonomer (b): 5 to 15% by weight and
comonomer (c): 70 to 92% by weight, the percentages being with reference to the total amount of the comonomers (a), (b) and (c); comonomer (b) in (e): 5 to 15% with reference to the amount of (e).

5. An organic dispersion as claimed in claim 3 having the following relative proportions of the comonomers:
comonomer (a): 3 to 15% by weight;
comonomer (b): 5 to 15% by weight and
comonomer (c): 70 to 92% by weight, the percentages being with reference to the total amount of the comonomers (a), (b) and (c); comonomer (b) in (e): 5 to 15% with reference to the amount of (e).

6. An organic dispersion as claimed in claim 1 having the following relative proportions of the comonomers:
comonomer (a): 3 to 15% by weight;
comonomer (b): 5 to 15% by weight and
comonomer (c): 70 to 92% by weight, the percentages being with reference to the total amount of the comonomers (a), (b) and (c); comonomer (b) in (e): 5 to 15% with reference to the amount of (e).

7. An organic dispersion as claimed in claim 3 wherein the amount of (e) is 10 to 50% by weight of the amount of copolymer from (a), (b) and (c).

8. An organic dispersion as claimed in claim 4 wherein the amount of (e) is 10 to 50% by weight of the amount of the copolymer from (a), (b) and (c).

9. An organic dispersion as claimed in claim 1 having a solids content of from 40 to 60% by weight with reference to the organic dispersion.

References Cited

UNITED STATES PATENTS

| | | | |
|---|---|---|---|
| 2,680,110 | 6/1954 | Loughran et al. | 260—72 |
| 3,033,811 | 5/1962 | Brown et al. | 260—851 |
| 3,364,186 | 1/1968 | Wilhelm et al. | 260—41C |
| 3,466,266 | 9/1969 | Nagata et al. | 260—72 |

MORRIS LIEBMAN, Primary Examiner

H. H. FLETCHER, Assistant Examiner

U.S. Cl. X.R.

117—121, 124, 132, 140; 260—30.4, 31.2, 32.4, 32.8, 33.2, 33.4, 33.6, 33.8, 72, 80.73, 851, 852, 853, 855